Oct. 25, 1927.
A. E. LAKE
1,647,049
LIFTING JACK
Filed Nov. 28, 1925
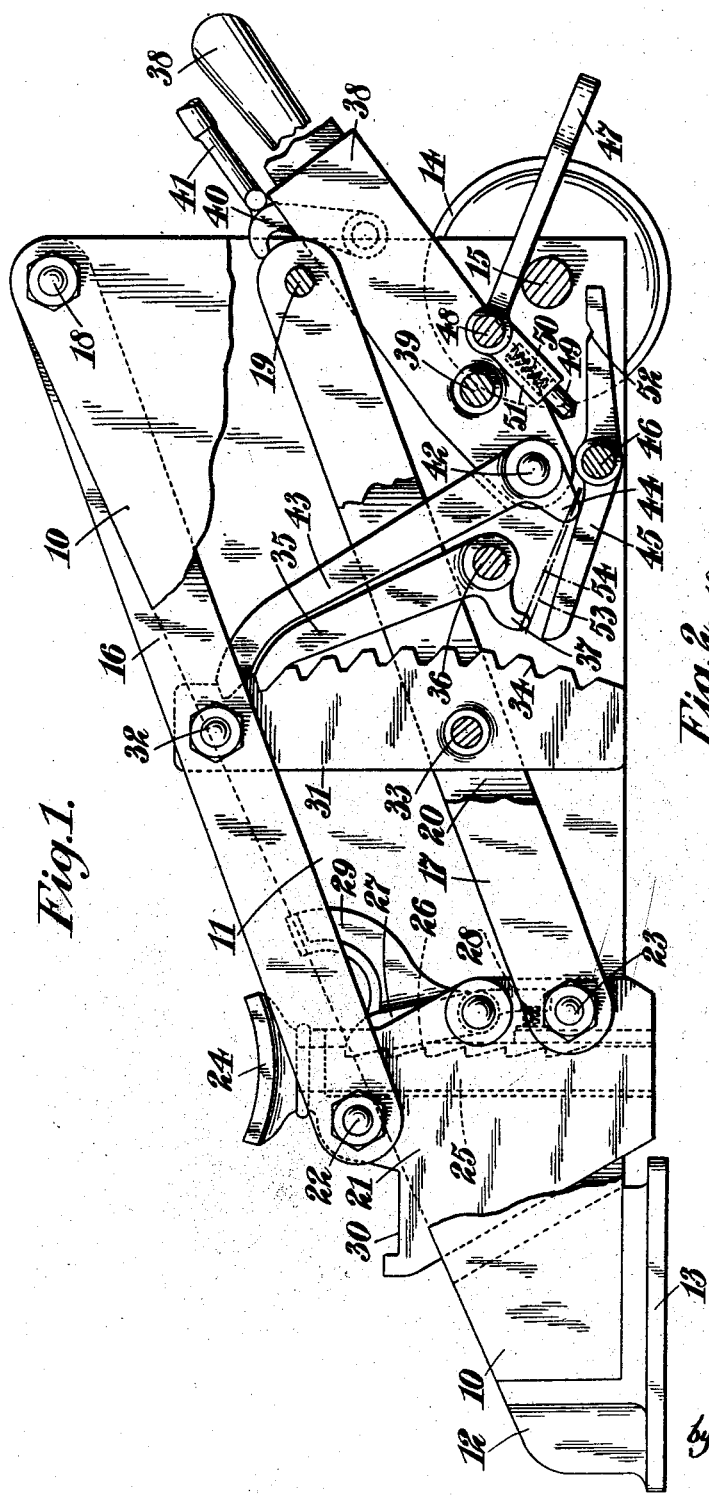
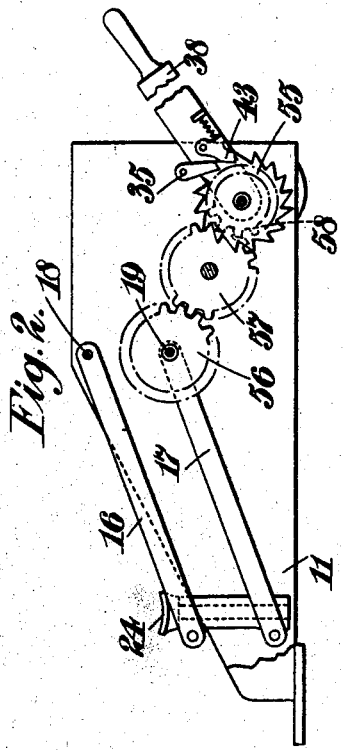
Inventor
A. E. Lake
by Wilkinson & Giusta
Attorneys.

Patented Oct. 25, 1927.

1,647,049

UNITED STATES PATENT OFFICE.

ARTHUR ERNEST LAKE, OF BISHOPS STORTFORD, ENGLAND.

LIFTING JACK.

Application filed November 28, 1925, Serial No. 71,931, and in Great Britain May 6, 1925.

This invention is for improvements in lifting jacks for use with vehicles and has for its object to provide an improved construction of jack such as is used in garage work and comprises a long hand-lever which is used to effect the lifting and also serves as a handle for moving the jack itself and adjusting it in position under a vehicle. In jacks of this type the hand-lever slopes upwardly from its pivot in the body of the jack to a convenient height for the operator; in such jacks as hitherto made the pivot-pin of the hand-lever has been situated near the crutch, in order to give the desired leverage and it is sometimes not possible easily to introduce the jack into position underneath a car owing to the situation of the axle with respect to the frame or body, or to overhanging parts such as fuel tanks, luggage carriers or the like, and the object of the present invention is to overcome these difficulties in particular and also to provide a jack which is particularly suitable for general work.

In the accompanying drawings—

Figure 1 is a side elevation with parts broken away showing one construction of jack in accordance with the present invention, and Figure 2 is a diagrammatic representation of a modified construction of jack which also falls within the scope of the present invention.

Like reference characters indicate like parts in all the drawings.

Referring to Figure 1, the jack comprises a framework or body which is constructed of two side plates 10, 11 which are of substantially triangular shape and are spaced apart to receive the mechanism between them, the plate 10 being shown broken away to exhibit the mechanism. At the forward or lower end the two plates are secured to a casting 12 which provides a foot 13 suitable for resting on the ground and sustaining the load of the jack. The body is supported at its rear end on a pair of wheels 14 mounted on an axle 15 which also braces the side plates 10, 11. If it is desired, the foot 13 may be replaced by a wheel, or alternatively a wheel may be provided at that end of the body and a foot at the other or rear end in place of the wheels 14.

A pair of links 16, 17 are pivoted one above the other on pivot-pins 18, 19 secured to the body near that end thereof which is higher, and these links extend towards the other end of the body. Preferably each of these links is of a twin construction comprising two links side by side as shown at 17, 20.

A crutch indicated generally by the reference 21 is pivotally mounted on the free or forward ends of the links 16, 17 by pivot-pins 22, 23, and this crutch member preferably carries a crutch proper 24 which is vertically adjustable in it. The crutch member 24 is mounted on the end of a bar 25 which slides in the crutch member 21 and is provided with ratchet teeth 26 which are engaged by a holding pawl 27 to retain the crutch 24 when it has been raised relatively to the crutch member 21. A spring 28 is provided on the pawl 27 normally to hold it in engagement with the teeth 26 and a projection 29 is provided also on the pawl 27 to enable it to be withdrawn from engagement with the teeth 26 when it is desired to lower the crutch 24 in the crutch member 21. This crutch member may also be provided with an auxiliary step 30 situated at a lower height than the lowest position of the crutch 24 if so desired.

Preferably the links 16, 17 are arranged parallel with one another, and the link 17 is somewhat shorter than the link 16. The object of this construction is to render the vertical movement of the crutch 24 which is brought about by swinging the links 16, 17 in the vertical plane, more nearly a straight line movement than it would be if the links 16, 17 were the same length. This approximation to a straight line movement is brought about by the tilting of the crutch member 21 from a vertical position towards the pivots 18, 19 as the links swing upwards to a horizontal position and then tilting it in the reverse direction when they swing upwards beyond the horizontal; the compounding of the movement of the ends of the links 16, 17 with this tilting of the crutch member 21 causes the movement of the crutch 24 to be more nearly a straight line movement than it would otherwise be.

At a convenient point in the links 16, 17, say at the middle of their length, there is secured to them a rack-member 31, the connection being by means of pivot pins 32, 33. The rear edge of this member, that is to say the edge adjacent the pivots 18, 19, is formed with a series of ratchet teeth 34, and the pitch line of these teeth is preferably curved convexly so as to compensate for the curved path of movement which the rack-member 31 has when the links 16, 17 are swung in a vertical plane.

A pawl 35 is mounted to swing on a pivot-pin 36 secured in the body of the jack and is so arranged that its own weight holds it normally in engagement with the teeth 34 aforesaid. This pawl is also provided with a lug 37 extending laterally from it near its pivotal axis for the purpose hereinafter set forth.

The hand-lever by which the jack is operated is indicated at 38 and is pivoted on a suitable pin 39 secured in the body of the jack. This hand-lever may be provided with a hook or like detent 40 which can be manually engaged, through the member 41, with the pivot-pin 19 or some other convenient part of the device to retain the hand-lever 38 in its raised position. At the forward or lower end of the hand-lever there is mounted a pivot-pin 42 carrying a pawl 43 to engage the ratchet teeth 34 aforesaid, and the parts are so disposed that it is normally retained in such engagement by its own weight. This pawl 43 is provided with a lug 44 extending laterally from near its pivotal axis, and somewhat similar to the lug 37 aforesaid, for the purpose hereinafter to be described. The operation of raising the crutch 24 consists in depressing the hand-lever 38 so as to lift its pawl 43 which is in engagement with one of the ratchet teeth 34. This lifting movement of the pawl lifts the rack-member 31 and thereby swings the links 16, 17 in a vertical plane about their pivots 18, 19 respectively so that the crutch member 21 is itself lifted. During such lifting the pawl 35 rides over the ratchet teeth 34 and retains the rack 31 in any position to which it has been raised when the downward movement of the hand-lever is stopped or reversed.

When a vehicle has been lifted by the jack it is necessary to be able to lower it again whilst retaining full control over its movement, and this is effected by means of the hand-lever 38, and the lugs 37, 44 on the pawls 35, 43 respectively, together with a member 45 which co-operates with the lugs. This member 45 consists of a lever or plate which is pivoted on a pivot-pin 46 secured in the body of the jack. A second lever 47 pivoted on a pin 48 in the body of the jack carries a plunger 49 with which a spring 50 cooperates, normally pressing the plunger outwards from its socket 51. This socket is carried by the lever 47 which is adjustable on its pivot-pin so as to swing the plunger 49 into such a position that it can engage a notch 52 near one end of the lever 45 and thereby yieldingly press the other end of the lever upwards towards the lugs 44, 37. The strength of the spring 50 is selected so that if either pawl 35 or 43 is released from engagement with a ratchet tooth 34, by relative movement between the pawl and the rack-member 31, the pressure exerted by the member 45 on the lug of the pawl will rotate the pawl in a clockwise direction in Figure 1 clear of the ratchet teeth and will retain it in that position. But the strength of the spring 50 is not sufficient to disengage either pawl from a ratchet tooth 34 when it is supporting any load thereby, and in practice the weight of the rack-member, links and crutch provides sufficient load to retain a pawl in engagement with a tooth against the action of the spring 50.

When the lever 47 occupies the position shown in Figure 1 the lever 45 also occupies the position shown in Figure 1 and is inoperative. Let it be assumed now that the rack-member 31 with the crutch 24 is in a raised position and that it is desired to lower it. The lever 47 is swung upwards to engage the plunger 49 with the notch 52 and thereby press the other end of the lever 45 upwards. Since the load is being sustained by the holding-pawl 35, a slight upward movement of the hand-lever 38 will release the lifting-pawl 43 from the tooth 34 wherewith it is engaged, and the lever 45 acting on the lug 44 will swing this pawl in a clockwise direction out from engagement with the teeth, and the lever 45 will swing up under the influence of the spring 50 into the position indicated by the line 53 where it is in contact with the lug 37 on the pawl 35, but it cannot move this pawl because it is in engagement with a ratchet tooth by the load which it is supporting.

If now the hand-lever is swung downwards, the pawl 43 will be lifted and will be kept out from engagement with the ratchet teeth 34 until its lug 34 is clear of the lever 45 which is in the position 53. Further movement of the hand-lever 38 will lift the pawl 43 and let it fall into engagement with a ratchet tooth higher than that with which it was originally engaged. A slight downward movement of the hand-lever 38 will now cause the load to be taken by the pawl 43, and by lifting the rack-member 31 the pawl 35 will be released from the tooth wherewith it was engaged. The lever 45 will thereupon swing further up into the position indicated by the line 54 and in so doing will throw the pawl 35 out from engagement with the ratchet teeth 34. The whole of the load is now supported by the operator through the hand-lever 38 and he can let this handle rise so that the load is lowered. When the pawl 43 has moved downwards sufficiently in this movement, its lug 44 will engage the lever 45 and since there is a load on the pawl 43 it will overcome the resistance of the spring 50 and depress the lever 45 until it is disengaged from the lug 37 and thereby allows the pawl 35 to fall into engagement with a ratchet tooth 34. Further downward movement of the pawl 43 throws the load on to the holding-pawl 35 and thereafter releases the lifting-pawl 43 from its ratchet tooth so that the member 45 then becomes operative to throw the pawl 43 out from engagement with the teeth.

By the cycle of operations hereinbefore described the load has been lowered through a space of one or more teeth depending upon the precise adjustment and proportions of the lugs 37, 44, and this cycle is repeated as many times as is necessary to bring the load to its lowermost position.

An important feature of the present invention is that the construction wherein the crutch is supported on links enables the crutch itself to be placed at a much greater distance than has hitherto been possible from the pivot-pin of the hand-lever, so that the jack can be inserted under an overhung vehicle to engage an axle thereof without the hand-lever fouling any part of or carried by the vehicle, and moreover, the length of the links 16, 17 in relation to the desired range of operation of the jack is such that only a comparatively small angular movement, less than a right-angle, is imparted to these links.

Alternatively, it is possible to obtain an increased leverage for the hand-lever if so desired, by means of a train of gears as illustrated diagrammatically in Figure 2. In this case one of the links 17 is secured to a gear-wheel 56 which meshes with an idler 57 which in turn meshes with a gear-wheel 58 coaxial with the pivot-pin of the hand-lever 38. By making the gear-wheel 58 smaller than the gear-wheel 56 a mechanical advantage is obtained which increases the effective leverage of the hand-lever 38.

Also it is not essential to the present invention that the links 16, 17 should be of different lengths as illustrated in Figure 1, for they may be of the same length as illustrated in Figure 2, although it is then desirable that the angular movement of the links 16, 17 should be limited in order that the lateral component of the movement of the crutch 24 should not be excessive.

These and other modifications in the precise details of mechanical construction are all held to lie within the scope of this invention as set forth in the appended claims.

I claim:

1. In a lifting jack, the combination of a body, a beam pivotally mounted on the body to swing about a horizontal axis near one end thereof, a crutch member carried by the beam at the free end thereof, a hand-lever pivoted on the body to swing about a horizontal axis, and means so operatively connecting the hand lever with the beam as to provide a compound lever, which means comprise a rack member secured on said beam between its axis of pivoting and said crutch member, and a lifting pawl arranged to engage said rack member and to be reciprocated by said hand-lever.

2. In a lifting jack, the combination of a body, a pair of links pivoted at one end thereon to swing about horizontal axes near one end thereof, a crutch member carried by the links at the free end thereof, a hand-lever pivoted on the body to swing about a horizontal axis, and means so operatively connecting the hand-lever, with said links as to provide a compound lever, which means comprise a rack member pivotally carried by said pair of links at a point nearer the pivots thereof than is the crutch member, and a lifting pawl arranged to engage said rack member and be reciprocated by said hand lever.

3. In a lifting jack, the combination of a body, a beam pivotally mounted on the body to swing about a horizontal axis near one end thereof, a crutch member carried by the beam at the free end thereof, a link which is parallel to the beam is shorter than the latter and is so pivoted to the body and crutch member as to lie below the beam, a hand-lever pivoted on the body to swing about a horizontal axis, and means so operatively connecting the hand-lever with the beam and link as to provide a compound lever, which means comprise a rack member pivotally secured to said beam and link between their axes of pivoting and said crutch member, and a lifting pawl arranged to engage said rack member and to be reciprocated by said hand lever.

4. In a jack for lifting vehicles, the combination of a body, supporting wheels whereon it may be moved to a desired position, a pair of links pivoted to the body about horizontal axes near one end thereof, said links extending to near the other end of the body, a crutch pivotally supported on the free ends of said links, a rack-member secured on said links at a point nearer the pivots thereof than is said crutch, a hand-lever pivoted on said body and extending from the lower part of the end thereof remote from said crutch, a pawl engaging said rack-member to lift it, means operatively connecting it to said hand-lever to be reciprocated thereby, and means for retaining said crutch when lifted.

5. In a jack for lifting vehicles the combination of a body, supporting wheels whereon it may be moved to a desired position, a pair of links pivoted to the body about horizontal axes near one end thereof one above the other, said links extending to near the other end of the body, a crutch pivotally supported on the free ends of said links, a rack-member secured on said links between their pivotal axes and the said crutch, a hand-lever pivoted on said body near that end whereto the said links are pivoted, a pawl engaging said rack-member, means operatively connecting it to said hand-lever to be reciprocated thereby, and means for retaining said crutch when lifted.

6. In a jack for lifting vehicles the combination of a body, supporting wheels whereon it may be moved to a desired position, a pair of links pivoted to the body about horizontal axes near one end thereof one above the other, the lower of said links being shorter than the upper, but both extending to near the other end of the body, a crutch pivotally supported on the free ends of said links, a rack-member, means operatively connecting it to said crutch, a hand-lever pivoted on said body and extending from the lower part of that end thereof at which the links are pivoted, a pawl engaging said rack-member, means operatively connecting it to said hand-lever to be reciprocated thereby, and means for retaining said crutch when lifted.

7. In a lifting jack, the combination of a body, a beam pivotally mounted on the body to swing about a horizontal axis near one end thereof, a crutch member carried by the beam at the free end thereof, a hand-lever pivoted on the body to swing about a horizontal axis, and means so operatively connecting the hand lever with the beam as to provide a compound lever, which means comprise a rack member secured on said beam between its axis of pivoting and said crutch member, and a lifting pawl arranged to engage said rack member and to be reciprocated by said hand-lever, a wheel supporting one end of the body and rotatable about an axis lying transversely of the direction of length of the body, and detent means for so locking the hand lever to the body against movement about its pivot in at least one direction as to permit the hand lever to be used as a handle member for wheeling the hack on its wheel.

8. In a lifting jack, the combination of a body, a beam pivotally mounted on the body to swing about a horizontal axis near one end thereof, a crutch member carried by the beam at the free end thereof, a hand-lever pivoted on the body to swing about a horizontal axis, and means so operatively connecting the hand lever with the beam as to provide a compound lever, which means comprise a rack member secured on said beam between its axis of pivoting and said crutch member, and a lifting pawl arranged to engage said rack member and to be reciprocated by said hand-lever, a wheel pivotally supporting the end of said body at which the hand lever is pivoted, which wheel is rotatable about an axis lying transversely of the direction of length of the body, and a detent pivotally mounted on the hand-lever and arranged to engage the body so as to lock the hand-lever to the body against rocking movement in at least one direction, for permitting the hand lever to be used as a handle member for wheeling the jack on its wheel.

9. In a lifting jack the combination of a body, a crutch, means supporting said crutch on said body and permitting vertical movement relatively thereto, a rack member operatively connected to said crutch, a hand-lever pivoted on said body, a lifting pawl pivotally mounted on said hand-lever and moving therewith, which pawl has a lug that tends to hold it yieldingly in engagement with said rack member, a holding pawl pivotally mounted on said body, which holding pawl has a lug that tends to hold it yieldingly in engagement with said rack member to support it when lifted, a pawl-unlocking member so positioned as to engage the lug on said holding pawl and to be engaged by the lug on said lifting pawl when in and near its lowest position, and a yielding control which tends to operate said pawl-unlocking member.

10. In a lifting jack, the combination of a body, a crutch, means supporting said crutch on said body and permitting vertical movement relatively thereto, a rack member operatively connected to said crutch, a hand-lever pivoted on said body, a lifting pawl pivotally mounted on said hand lever and moving therewith, which pawl has a lug constituting a yielding control that tends to hold said pawl yieldingly in engagement with said rack member, a holding pawl pivotally mounted on said body, which holding pawl has a lug constituting a yielding control that tends to hold the holding pawl yieldingly in engagement with said rack member to support it when lifted, a pawl-unlocking member so positioned as to engage the lug on said holding pawl and to be engaged by the lug on said lifting pawl when in and near its lowest position, and a yielding control which tends to operate said pawl-unlocking member and is stronger than either of said yielding controls for the pawls, whereby it can unlock either pawl when the pawl has no load on it, said pawl-unlocking member being further so positioned as to be disengaged from the holding pawl by the engagement with it of the lifting pawl when the latter is loaded.

11. In a jack for lifting vehicles, the combination of a body, supporting-wheels thereon whereby it is movable to a desired position, a pair of links pivoted to the body about horizontal axes one above the other near one end thereof, the lower of said links being shorter than the upper, but both extending to near the other end of the body, a crutch pivotally supported on the free ends of said links, said links being of such length as will give the desired vertical movement to said crutch by an angular movement of the links through a relatively short arc, a rack-member secured on said links between their pivotal axes and the said crutch, a hand-lever pivoted on said body near the bottom thereof and near that end whereto the said links are pivoted, a pawl engaging said rack-member, means operatively connecting said pawl to said hand-lever to be reciprocated thereby, a holding-pawl pivoted on the body of the jack and engaging said rack-member to hold it when lifted, a lug on each of said pawls, means whereby each of said pawls is yieldingly held in engagement with said rack-member, a pawl-unlocking-member so positioned as to engage the lug on said holding-pawl and to be engaged by the lug on said lifting-pawl when in and near its lowest position, a yielding control which tends to operate said pawl-unlocking member and means for rendering said yielding control inoperative at will.

In testimony whereof I affix my signature.

ARTHUR ERNEST LAKE.